(12) United States Patent
Sumioka et al.

(10) Patent No.: US 10,438,148 B2
(45) Date of Patent: Oct. 8, 2019

(54) SCHEDULING SUPPORTING METHOD, INFORMATION PROCESSING DEVICE, AND COMPUTER-READABLE RECORDING MEDIUM

(71) Applicant: FUJITSU LIMITED, Kawasaki-shi, Kanagawa (JP)

(72) Inventors: Motoshi Sumioka, Kawasaki (JP); Masahide Noda, Kawasaki (JP); Kei Taira, Kita (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 15/216,038

(22) Filed: Jul. 21, 2016

(65) Prior Publication Data

US 2017/0039088 A1   Feb. 9, 2017

(30) Foreign Application Priority Data

Aug. 5, 2015   (JP) .................................. 2015-155325

(51) Int. Cl.
   *G06Q 10/06*   (2012.01)
(52) U.S. Cl.
   CPC .............................. *G06Q 10/06311* (2013.01)
(58) Field of Classification Search
   None
   See application file for complete search history.

(56) References Cited

U.S. PATENT DOCUMENTS

| 6,457,049 B2* | 9/2002 | Lewis ..................... G06Q 50/24 705/1.1 |
| 2008/0114809 A1* | 5/2008 | MacBeth ............. G06Q 10/109 |
| 2009/0240546 A1 | 9/2009 | Sato |
| 2011/0066467 A1* | 3/2011 | Kapoor .................. G06Q 10/06 705/7.12 |
| 2013/0191836 A1* | 7/2013 | Meyer .................. G06F 9/4881 718/103 |

FOREIGN PATENT DOCUMENTS

| JP | 2006-245689 | 9/2006 |
| JP | 2008-226085 | 9/2008 |
| JP | 2009-122791 | 6/2009 |
| JP | 2009-223833 | 10/2009 |
| JP | 2012-256155 | 12/2012 |
| JP | 2014-127141 | 7/2014 |

OTHER PUBLICATIONS

JPOA—Japanese Office Action dated Mar. 26, 2019 for Japanese Patent Application No. 2015-155325, with English translation.

* cited by examiner

*Primary Examiner* — Wynuel S Aquino
(74) *Attorney, Agent, or Firm* — Fujitsu Patent Center

(57) ABSTRACT

A scheduling supporting method includes: storing one or more sets of task information and subtask groups each of which corresponds to one set of task information and which is structured to have one or more stages, by a processor; and presenting, at time of presenting each of a plurality of tasks, from among a subtask group corresponding to each task, a subtask of a preset stage according to structure, by the processor.

4 Claims, 14 Drawing Sheets

FIG.3

| PROJECT NAME | TASK SET | STARTING TASK | START TIME | DUE TIME |
|---|---|---|---|---|
| 22a | 22b | 22c | 22d | 22e |
| PROJECT1 | {sz8934:{sort:s1, user: taro, next: fs95w4 }, fs95w4:{...},...} | sz8934 | 03/01/2014 10:00:00 | 03/13/2014 16:00:00 |
| | | | | |
| | | | | |

| USER (23a) | PROJECT NAME (23b) | PROFICIENCY DEGREE (23c) |
|---|---|---|
| TARO | PROJECT1 | 5 |
| HANAKO | PROJECT2 | 4 |
|  |  |  |

| TASK ID (24a) | TASK TYPE (24b) | USER (24c) | RE-SOURCE (24d) | ESTIMATED START TIMING (24e) | ESTIMATED END TIMING (24f) |
|---|---|---|---|---|---|
| sz8934 | s1 | TARO | r1 | 03/02/2015 10:00 | 03/02/2015 12:00 |
| fs95w4 | s2 | TARO | r1, r2 | 03/02/2015 14:00 | 03/02/2015 16:00 |
| s9346d | s1 | TARO | r1 | 03/02/2015 11:00 | 03/02/2015 12:30 |

| TASK ID (25a) | TASK TYPE (25b) | STANDARD PERIOD (25c) | ACTUAL PERFORMANCE PERIOD (25d) |
|---|---|---|---|
| sz8934 | s1 | 2 h | 1.78 h |
| fs95w4 | s2 | 2 h | 2.22 h |
| s9346d | s1 | 2 h | 1.56 h |

SCHEDULING SUPPORTING METHOD, INFORMATION PROCESSING DEVICE, AND COMPUTER-READABLE RECORDING MEDIUM

CROSS-REFERENCE TO RELATED APPLICATION

This application is based upon and claims the benefit of priority of the prior Japanese Patent Application No. 2015-155325, filed on Aug. 5, 2015, the entire contents of which are incorporated herein by reference.

FIELD

The embodiments discussed herein are related to a scheduling supporting method, an information processing device, and a computer-readable recording medium.

BACKGROUND

As an electronic tool for recording the plan of activities of a person, a schedule management tool of an electronic schedule book is known that is stored in a handheld terminal device of an individual or in a shared terminal device accessible to a number of people. In an electronic schedule book are stored the estimated start timings and the estimated end timings of the activities (called "tasks") to be performed by the user of the electronic schedule book. The user of the electronic schedule book can check the task details by displaying them on, for example, the display of a handheld terminal device, and can manage his or her schedule.

Meanwhile, various methods for presenting the task details to the user have been disclosed.

As an example, an input supporting device has been disclosed in which, at the time of inputting a predetermined input item as a result of a user operation, it is made possible to select display or non-display of input supporting information, which corresponds to the predetermined input item having a segmented configuration for each input stage, at each input stage in response to a user operation. That is, the input supporting device varies the to-be-presented task details according to the user operation. As another example, a technology has been disclosed in which, at the end of a task, an empirical value is calculated based on the period of time from the start to the end of the task; executant skill information is updated; and, when a task search request is issued, the information is presented to the user who is suitable for the task (for example, refer to Japanese Laid-open Patent Publication No. 2012-256155 and Japanese Laid-open Patent Publication No. 2009-223833).

However, even if the task details are presented using a related method, it is difficult to optimize the execution of tasks in each task group forming a task flow.

In the example of the input supporting device, it is made possible to select display or non-display of input supporting information, which corresponds to the predetermined input items, at each input stage in response to a user operation. However, the technology is not meant to enable automatic selection according to the skill (the degree of proficiency) of the user. Moreover, in the other example, although executant skill information of tasks is used, the technology is meant to recommend the user who is suitable for a particular task, but is not meant allow a single user to perform tasks in each task group forming a task flow.

SUMMARY

According to an aspect of the embodiments, a scheduling supporting method includes: storing one or more sets of task information and subtask groups each of which corresponds to one set of task information and which is structured to have one or more stages, by a processor; and presenting, at time of presenting each of a plurality of tasks, from among a subtask group corresponding to each task, a subtask of a preset stage according to structure, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an exemplary data structure of a task flow DB;

FIG. 4 is a diagram illustrating an exemplary data structure of a proficiency degree DB;

FIG. 5 is a diagram illustrating an exemplary data structure of a schedule DB;

FIG. 6 is a diagram illustrating an exemplary data structure of an actual performance DB;

DESCRIPTION OF EMBODIMENTS

Preferred embodiments will be explained with reference to accompanying drawings. However, the present invention is not limited by the embodiment.

Configuration of Scheduling Supporting System

Figure 1:
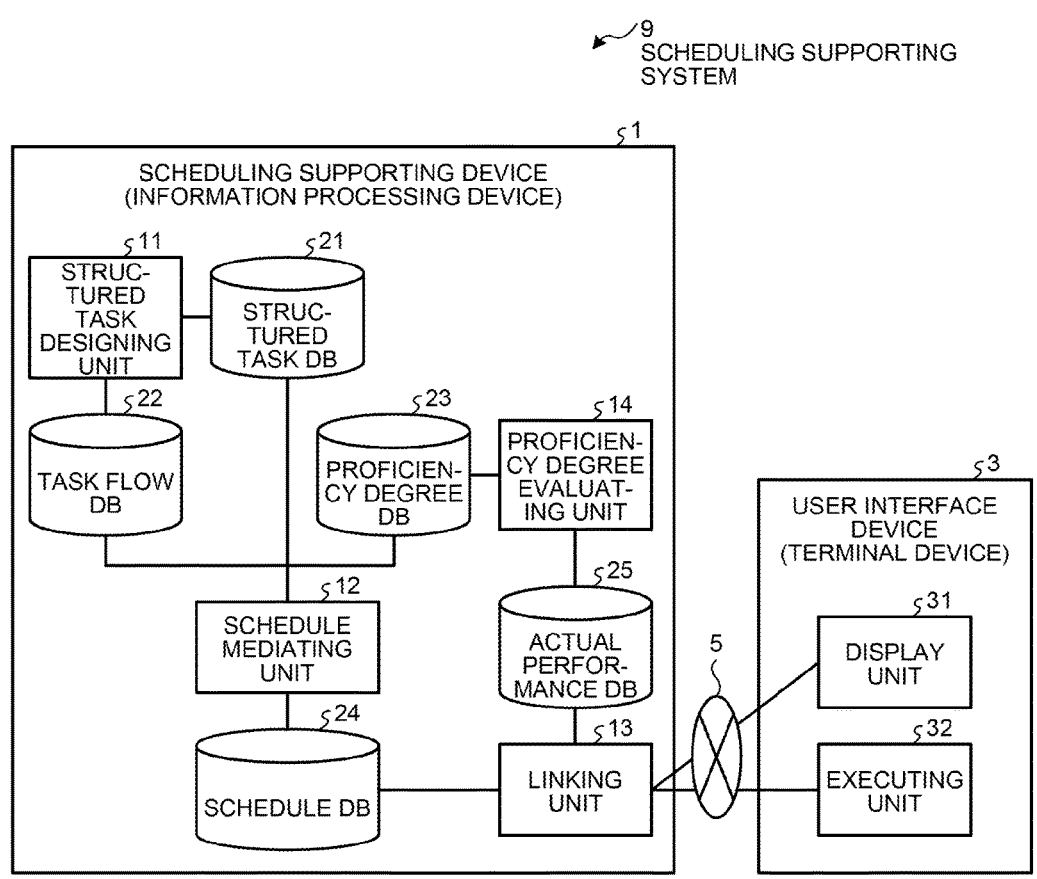
FIG. 1 is a functional block diagram of a system that includes a scheduling supporting device according to an embodiment.

FIG. 1 is a configuration diagram of a system that includes a scheduling supporting device according to the embodiment. A scheduling supporting system 9 includes a scheduling supporting device 1 and a user interface device 3. The scheduling supporting device 1 is connected to the user interface device 3 via a network 5. As an example, the scheduling supporting device 1 corresponds to an information processing device.

The user interface device 3 is an electronic device that can be used by the executant of a task. The user interface device 3 can make the executant of a task aware of the task details and the scheduling details. Herein, the user interface device 3 corresponds to a handheld terminal device represented by a smartphone. However, that is not the only possible case. Alternatively, the user interface device 3 can be a laptop personal computer, a desktop personal computer, or a personal digital assistant (PDA).

The scheduling supporting device 1 registers a sequence of tasks in the form of a flow, as well as registers a subtask group that corresponds to each of the tasks and that is structured to have a plurality of granularities. The scheduling supporting device 1 estimates, from the period of time used by the user to perform a task, the degree of proficiency of the user toward the flow; and updates, according to the degree of proficiency, the granularity corresponding to the concerned task. Then, from among the subtasks corresponding to the next task, the scheduling supporting device 1 presents a subtask corresponding to the updated granularity to the user.

Herein, the term "task" is used as a term that can cover the overall actions performed by a person. An example of a "task" is the work in the course of business. However, that is not the only possible case. That is, a "task" can also cover actions such as traveling or dining privately. Moreover, a "task" can also cover taking rest in between a plurality of actions, and moving to a particular place for performing the next action. Meanwhile, "task information" represents the information defining the task details. For example, the "task information" can contain the specific work details, the task executant, the time taken for task execution, the place of task execution, and the tools used in task execution. Herein, the "task information" can contain information defining or not defining the estimated start timing and the estimated end timing of a task. The details of the "task information" are given later. Meanwhile, the "scheduling" either implies setting, for a task for which the estimated start timing and the estimated end timing are not set, at least either the estimated start timing or the estimated end timing; or implies resetting, for a task for which at least either the estimated start timing or the estimated end timing are set, the estimated start timing or the estimated end timing by changing it. Moreover, a "schedule" represents information indicating the result of performing "scheduling". When the "schedule" is displayed in a form that is recognizable for a person using the eyesight, or using the auditory sensor, or using the olfactory sense; it is called a "timetable". Furthermore, "mediation" implies identifying the order of execution of a plurality of tasks and scheduling the tasks.

Configuration of Scheduling Supporting Device

As illustrated in FIG. 1, the scheduling supporting device 1 includes a structured task designing unit 11, a schedule mediating unit 12, a linking unit 13, and a proficiency degree evaluating unit 14. Moreover, the scheduling supporting device 1 includes a structured task database (DB) 21, a task flow DB 22, a proficiency degree DB 23, a schedule DB 24, and an actual performance DB 25.

The structured task DB 21, the task flow DB 22, the proficiency degree DB 23, the schedule DB 24, and the actual performance DB 25 are stored in a memory unit (not illustrated). The memory unit corresponds to a memory device in the form of a nonvolatile memory element such as a flash memory or a ferroelectric random access memory (FRAM) (registered trademark).

The structured task DB 21 is used to store, on a task-by-task basis, a subtask group formed by structuring the task and the resource used in executing the task. As an example, the resource can be a checklist of items to be checked at the time of executing the task. However, that is not the only possible case. As another example, the resource can be a list of applications used in executing the task. Moreover, when the resource is in the form of a text, an example of the resource can be a text compressed using the technology for compressing texts. The structured task DB 21 is created in advance before the operations, and is updated by the structured task designing unit 11 (described later).

The task flow DB 22 is used to store a flow of a sequence of tasks. The task flow DB 22 is generated by the structured task designing unit 11 (described later). A flow of a sequence of tasks is hereinafter called a "task flow", and a single task flow is synonymous to a project.

The proficiency degree DB 23 is used to store the degree of proficiency for a task flow corresponding to a user. The schedule DB 24 is used to store the estimated start timing and the estimated end timing for each task. The actual performance DB 25 is used to store the actual performance period for each task. Meanwhile, regarding exemplary data structures of the structured task DB 21, the task flow DB 22, the proficiency degree DB 23, the schedule DB 24, and the actual performance DB 25; the explanation is given later.

At the time of designing a task flow, the structured task designing unit 11 stores one or more sets of task information as well as stores subtask groups each of which corresponds to one set of task information and which is structured to have one or more granularities. For example, the structured task designing unit 11 makes use of a user interface and, when a task is to be added to the specified task flow, associates the added task to the specified task flow and updates the task flow DB 22. Moreover, the structured task designing unit 11 makes use of the user interface and, when the tree structure of a subtask group corresponding to a predetermined task is to be updated, identifies the higher-level task of the updated task from the task flow DB 22. Then, the structured task designing unit 11 associates the updated subtask under the identified higher-level task and updates the task flow DB 22. Moreover, the structured task designing unit 11 reflects the resource of the updated subtask in the resource of the identified higher-level task. Herein, the term "updating" implies, for example, addition, deletion, or modification. As an example, the structured task designing unit 11 reflects the concerned subtask in the structured task DB 21 with the aim of adding (concatenating) the resource of the subtask to the resource of the higher-level task.

Figure 2:
FIG. 2 is a diagram illustrating an exemplary data structure of a structured task database (DB)

Explained with reference to FIGS. 2 and 3 is an exemplary data structure of the structured task DB 21 and the task flow DB 22, respectively. FIG. 2 is a diagram illustrating an exemplary data structure of the structured task DB. As illustrating in FIG. 2, in the structured task DB 21; task name 21b, subtask 21c, resource 21d, and standard period 21e are stored in a corresponding manner to task type 21a. Herein, the task type 21a represents the types of tasks, and includes parent tasks as well as child tasks constituting the tree structures of tasks. A child task implies a subtask of a parent task. The task name 21b represents the name of the task indicated by the task type 21a. The subtask 21c represents the task type of a subtask corresponding to the task indicated by the task type 21a. The resource 21d represents the resource indicated by the task type 21a. The standard period 21*e* represents the average execution period for the task indicated by the task type 21*a*.

As an example, when "s1" represents the task type 21*a*; "idea extraction" is stored as the task name 21*b*, "r1" is stored as the resource 21*d*, and "2h" is stored as the standard period 21*e*. When "s3" represents the task type 21*a*; "material creation" is stored as the task name 21*b*, "s3-1, s3-2, s3-3" is stored as the subtask 21*c*, " " is stored as the resource 21*d*, and "3 h" is stored as the standard period 21*e*. When "s3-1" represents the task type 21*a*; "background" is stored as the task name 21*b*, " " is stored as the subtask 21*c*, "r3-1" is stored as the resource 21*d*, and "1 h" is stored as the standard period 21*e*.

FIG. 3 is a diagram illustrating an exemplary data structure of the task flow DB. As illustrated in FIG. 3, in the task flow DB 22; task set 22*b*, starting task 22*c*, start time 22*d*, and due time 22*e* are stored in a corresponding manner to project name 22*a*. Herein, the project name 22*a* represents the name of the project corresponding to a single task flow. The project indicated by the project name 22*a* is different according to the work details. The task set 22*b* represents the set of tasks constituting the project that is indicated by the project name 22*a*. In the task set 22*b*, the order of execution of a plurality of tasks is set, as well as distinction about whether each task is a parent task or a child task is set. The starting task 22*c* represents the starting task in the project indicated by the project name 22*a*. The start time 22*d* represents the start time of the project indicated by the project name 22*a*. The due time 22*e* represents the due time of the project indicated by the project name 22*a*.

As an example, when "project1" represents the project name 22*a*; {sz8934}: { . . . }, fs95w4w4: { . . . } . . . } is stored as the task set 22*b*, and "sz8934" is stored as the starting task. Moreover, "03/01/2014 10:00:00" is stored as the start time 22*d*, and "03/13/2014 16:00:00" is stored as the due time 22*e*.

Returning to the explanation with reference to FIG. 1, the schedule mediating unit 12 mediates the schedule of a user with respect to a plurality of tasks based on the order of execution of a plurality of tasks and based on the degree of proficiency of that user toward the task flow (project) including those tasks. For example, the schedule mediating unit 12 obtains, from the proficiency degree DB 23, the degree of proficiency of the user toward the task flow to be actually executed. Then, the schedule mediating unit 12 identifies, from the task flow DB 22, the task to be executed next in the concerned task flow. Based on the task flow DB 22, the schedule mediating unit 12 selects a subtask group according to the degree of proficiency of the user toward the task to be executed next. That is, the schedule mediating unit 12 selects the subtask group having the granularity that corresponds to the next task and that is in accordance with the degree of proficiency updated by the proficiency degree evaluating unit 14 (described later). The schedule mediating unit 12 adjusts, with respect to each task in the selected subtask group, the vacant time in the schedule of the user and performs registration in the schedule DB 24. Besides, based on the structured task DB 21, the schedule mediating unit 12 registers, in the schedule DB 24, the task-by-task resource for each task in the selected subtask group.

Explained with reference to FIGS. 4 and 5 is an exemplary data structure of the proficiency degree DB 23 and the schedule DB 24. FIG. 4 is a diagram illustrating an exemplary data structure of the proficiency degree DB. As illustrated in FIG. 4, in the proficiency degree DB 23, proficiency degree 23*c* is stored in a corresponding manner to user 23*a* and project name 23*b*. The user 23*a* represents the user who executes a project. The project name 23*b* represents the name of the project corresponding to a single task flow. The proficiency degree 23*c* represents the degree of proficiency toward the project indicated by the project name 23*b*. As an example, in the proficiency degree 23*c*, a higher number indicates a higher degree of proficiency. When the initial value is set to "5", if the proficiency degree 23*c* is equal to or greater than "5", then the user is assumed to be an advanced user. If the proficiency degree 23*c* is greater than "3" but smaller than "5", then the user is assumed to be an intermediate user. If the proficiency degree 23*c* is equal to or smaller than "3", then the user is assumed to be an elementary user. However, the meaning of the proficiency degree 23*c* is not limited to this explanation, and can be changed as needed. Moreover, the proficiency degree 23*c* is not limited to integers, but can be numbers with a decimal point or can be predefined symbols.

As an example, when "Taro" represents the user 23*a*; "project1" is stored as the project name 23*b* and "5" is stored as the proficiency degree 23*c*.

FIG. 5 is a diagram illustrating an exemplary data structure of the schedule DB. As illustrated in FIG. 5, in the schedule DB 24; task type 24*b*, user 24*c*, resource 24*d*, estimated start timing 24*e*, and estimated end timing 24*f* are stored in a corresponding manner to task identifier (ID) 24*a*. Herein, the task ID 24*a* represents an identifier that uniquely represents a task. The task type 24*b* represents the type of a task. The user 24*c* represents the user who executes a task. The resource 24*d* represents the resource of the task indicated by the task ID 24*a*. The estimated start timing 24*e* represents the estimated timing of starting the execution of the task indicated by the task ID 24*a*. The estimated end timing 24*f* represents the estimated timing of ending the execution of the task indicated by the task ID 24*a*.

As an example, when "sz8934" represents the task ID 24*a*; "s1" is stored as the task type 24*b*, "Taro" is stored as the user 24*c*, and "r1" is stored as the resource 24*d*. Moreover, "03/02/2015 10:00" is stored as the estimated start timing 24*e*, and "03/02/2015 12:00" is stored as the estimated end timing 24*f*.

Returning to the explanation with reference to FIG. 1, the linking unit 13 presents the next task to the user. That is, the linking unit 13 presents, from among the subtask group corresponding to the next task, a task of the subtask corresponding to the updated granularity to the user. For example, based on the schedule DB 24, the linking unit 13 presents, on the user interface device 3, information corresponding to the task ID 24*a* of the task estimated to be executed next. Herein, the task indicated by the task ID 24*a* is a task of the subtask selected by the schedule mediating unit 12 according to the degree of proficiency of the user. Examples of the task information include the resource, the estimated start timing 24*e*, and the estimated end timing 24*f*.

Moreover, the linking unit 13 registers the execution result of the presented task in the actual performance DB 25. For example, the linking unit 13 receives, from the user interface device 3, a start notification indicating that the execution of the presented task has started. Similarly, the linking unit 13 receives, from the user interface device 3, a completion notification indicating that the execution of the presented task is completed. Based on the timing of the start notification and the timing of the completion notification regarding the presented task; the linking unit 13 stores the actual performance period for the presented task in the actual performance DB 25.

Explained with reference to FIG. 6 is an exemplary data structure of the actual performance DB 25. FIG. 6 is a diagram illustrating an exemplary data structure of the actual performance DB. As illustrated in FIG. 6, in the actual performance DB; task ID 25a, task type 25b, standard period 25c, and actual performance period 25d are stored in a corresponding manner. The task ID 25a represents an identifier that uniquely identifies a task. The task type 25b represents the type of a task. The standard period 25c represents the standard execution period of the task indicated by the task ID 25a. The actual performance period 25d represents the actual execution period of the task indicated by the task ID 25a.

As an example, when "sz8934" represents the task ID 25a; "s1" is stored as the task type 25b, "2 h" is stored as the standard period 25c, and "1.78 h" is stored as the actual performance period 25d.

Returning to the explanation with reference to FIG. 1, the proficiency degree evaluating unit 14 updates the degree of proficiency of the user toward the task flow according to the execution result of the presented task. For example, the proficiency degree evaluating unit 14 obtains, from the actual performance DB 25, the actual performance period 25d and the standard period 25c corresponding to the task presented by the linking unit 13. Then, if the actual performance period 25d is longer than the standard period 25c; the proficiency degree evaluating unit 14 updates, as the degree of proficiency of the user toward the task flow, the actually-set degree in the proficiency degree DB 23 to a lower degree. That is done according to the determination that there is a decline in the degree of proficiency. On the other hand, if the actual performance period 25d is shorter than the standard period 25c; then the proficiency degree evaluating unit 14 updates, as the degree of proficiency of the user toward the task flow, the actually set degree in the proficiency degree DB 23 to a higher degree. That is done according to the determination that there is an increase in the degree of proficiency. As a result, starting from the next task of the presented task, the schedule mediating unit 12 can select a subtask group according to the updated degree of proficiency of the user and mediate the selected subtask group.

Given below is the explanation of a method for updating the degree of proficiency. Firstly, it is assumed that "5" is the initial state of the degree of proficiency. Alternatively, if the degree of proficiency of the user is already known, then it can be set as the initial state. When the actual performance period 25d is equal to or greater than twice the standard period 25c; the proficiency degree evaluating unit 14 updates, as the degree of proficiency of the user toward the task flow, the actually-set degree to a degree lowered by two. When the actual performance period 25d is equal to or greater than 1.5 times of the standard period 25c; the proficiency degree evaluating unit 14 updates, as the degree of proficiency of the user toward the task flow, the actually-set degree to a degree lowered by one. When the actual performance period 25d is equal to or smaller than 0.8 times of the standard period 25c; the proficiency degree evaluating unit 14 updates, as the degree of proficiency of the user toward the task flow, the actually-set degree to a degree increased by one. When the actual performance period 25d is equal to or smaller than half of the standard period 25c; the proficiency degree evaluating unit 14 updates, as the degree of proficiency of the user toward the task flow, the actually-set degree to a degree increased by two. Meanwhile, if a task is a reworking task; then the proficiency degree evaluating unit 14 updates, as the degree of proficiency of the user toward the task flow, the actually-set degree to a degree lowered by two.

Herein, the method for updating the degree of proficiency can be different according to the work details.

As an example, assume that "equipment inspection" represents the work details of a task flow or a task. In that case, if the actual performance period 25d is equal to or greater than twice the standard period 25c; the proficiency degree evaluating unit 14 updates, as the degree of proficiency of the user toward the task flow, the actually-set degree to a degree lowered by two. If the actual performance period 25d is equal to or greater than 1.5 times of the standard period 25c; the proficiency degree evaluating unit 14 updates, as the degree of proficiency of the user toward the task flow, the actually-set degree to a degree lowered by one. If the actual performance period 25d is close to the standard period 25c; the proficiency degree evaluating unit 14 updates, as the degree of proficiency of the user toward the task flow, the actually-set degree to a degree increased by one. If the actual performance period 25d is equal to or smaller than half of the standard period 25c; the proficiency degree evaluating unit 14 updates, as the degree of proficiency of the user toward the task flow, the actually-set degree to a degree lowered by one. Such updating is done according to the determination that the accuracy of equipment inspection is poor because the period of time used for equipment inspection is too short.

As another example, assume that "developmental work" represents the work details of a task flow or a task. In that case, if the actual performance period 25d is equal to or greater than four times of the standard period 25c; the proficiency degree evaluating unit 14 updates, as the degree of proficiency of the user toward the task flow, the actually-set degree to a degree lowered by two. If the actual performance period 25d is equal to or greater than twice the standard period 25c; the proficiency degree evaluating unit 14 updates, as the degree of proficiency of the user toward the task flow, the actually-set degree to a degree lowered by one. If the actual performance period 25d is equal to or smaller than 0.8 times of the standard period 25c; the proficiency degree evaluating unit 14 updates, as the degree of proficiency of the user toward the task flow, the actually-set degree to a degree increased by one.

Configuration of User Interface

As illustrated in FIG. 1, the user interface device 3 includes a display unit 31 and an executing unit 32.

The display unit 31 displays task information of the task that is presented by the scheduling supporting device 1. That is, the display unit 31 displays task information of the subtasks appropriate to the granularity of the task that is in accordance with degree of proficiency of the user. Examples of the task information include the resource of the task, the estimated start timing of the task, and the estimated end timing of the task. As a result, the display unit 31 can display the task information to the user at an appropriate granularity in accordance with the degree of proficiency of the user, and can provide appropriate support in executing the concerned task.

The executing unit 32 executes the task corresponding to the displayed task information. At the time of starting the task execution; the executing unit 32 sends, to the scheduling supporting device 1, a start notification indicating that the task execution has started. At the time of completing the task execution; the executing unit 32 sends, to the scheduling supporting device 1, a completion notification indicating that the task execution has completed. Regarding the manner by which the executing unit 32 notifies the start of execution of a task or notifies the completion of execution of a task; it can be a notification in response to the pressing of a button by the user, or it can be a manual email transmission or an automatic email transmission.

Example of Information Presentation Operation

Figure 7:
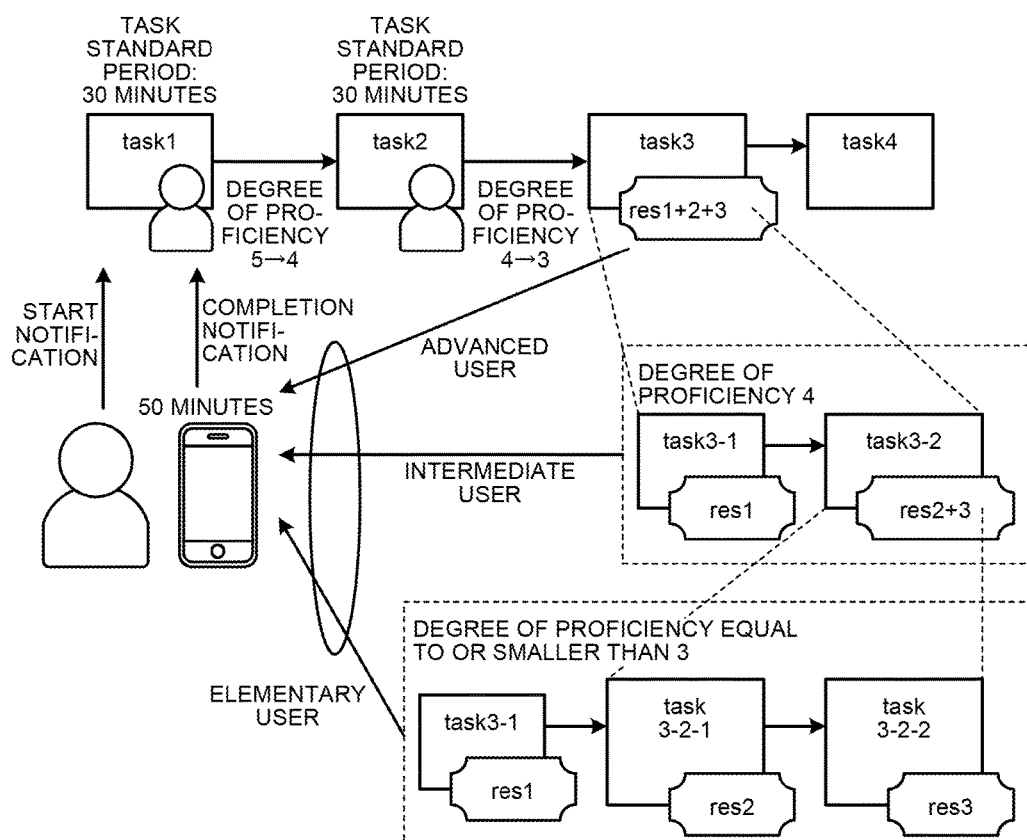
FIG. 7 is a diagram illustrating an example of an information presentation operation according to the embodiment.

Explained below with reference to FIG. 7 is an example of an information presentation operation according to the embodiment. FIG. 7 is a diagram illustrating an example of an information presentation operation according to the embodiment. As illustrated in FIG. 7, tasks task1, task2, task3, and task4 represent a sequence of tasks that are stored as a single task flow in the task flow DB 22. Regarding the task task3; a task task3-1 and a task task3-2 are assumed to represent the subtask group that corresponds to the granularity of the task corresponding to the degree of proficiency "4". Moreover, regarding the task task3-2; a task task3-2-1 and a task task3-2-2 are assumed to represent the subtask group that corresponds to the granularity of the task corresponding to the degree of proficiency of equal to or smaller than "3". Meanwhile, "res" represents resources, and indicates that a resource is allotted to each task. Moreover, in the proficiency degree DB 23, "5" is registered as the degree of proficiency of the user toward the task flow. Thus, if the degree of proficiency is equal to or greater than "5", then the user is assumed to be an advanced user. If the degree of proficiency is greater than "3" but smaller than "5", then the user is assumed to be an intermediate user. If the degree of proficiency is equal to or smaller than "3", then the user is assumed to be an elementary user.

The linking unit 13 receives an execution start notification about the task task1 from the user interface device 3. Afterward, the linking unit 13 receives an execution completion notification about the task task1 from the user interface device 3. By referring to the start notification and the completion notification, the linking unit 13 stores the actual performance period, which indicates the period of time used for the task task1, in the actual performance DB 25. The proficiency degree evaluating unit 14 obtains the actual performance period and the standard period corresponding to the task task1 from the actual performance DB 25, and estimates the degree of proficiency by comparing the actual performance period with the standard period. Herein, it is assumed that the actual performance period is 50 minutes and the standard period is 30 minutes. Since the actual performance period is longer than the standard period, the proficiency degree evaluating unit 14 updates the degree of proficiency to "4" that is lower than the actually-set degree "5". Then, the schedule mediating unit 12 selects, from the structured task DB 21, the subtask group corresponding to the granularity of the next task task2 in accordance with the updated degree of proficiency "4". Herein, it is assumed that the task task2 itself represents the subtask group that corresponds to the granularity of the task task2 corresponding to the degree of proficiency "4". Thus, the linking unit 13 presents the task information of the selected task task2 to the user interface device 3 of the user.

Subsequently, the linking unit 13 receives an execution start notification about the task task2 from the user interface device 3. Afterward, the linking unit 13 receives an execution completion notification about the task task2 from the user interface device 3. By referring to the start notification and the completion notification, the linking unit 13 stores the actual performance period, which indicates the period of time used for the task task2, in the actual performance DB 25. The proficiency degree evaluating unit 14 obtains the actual performance period and the standard period corresponding to the task task2 from the actual performance DB 25, and estimates the degree of proficiency by comparing the actual performance period with the standard period. Herein, it is assumed that degree of proficiency is updated to "3" that is lower than the actually-set degree "4". Then, the schedule mediating unit 12 selects, from the structured task DB 21, the subtask group that corresponds to the granularity of the next task task3 corresponding to the updated degree of proficiency "3". Herein, it is assumed that the tasks task3-1, task3-2-1, and task3-2-2 represent the subtask group that corresponds to the granularity of the task task3 corresponding to the degree of proficiency "3". Thus, the schedule mediating unit 12 performs scheduling with respect to each task of the selected subtask group. Based on the scheduling, the linking unit 13 presents the task information of the selected next task task3-1 on the user interface device 3 of the user. The task information contains res1 as the resource for the task task3-1.

Subsequently, based on the scheduling, the linking unit 13 presents the task information of the task task 3-2-1, which is the next task to the task 3-1, to the user interface device 3 of the user. The task information contains res2 as the resource for the task task3-2-1.

Subsequently, based on the scheduling, the linking unit 13 presents the task information of the task task3-2-2, which is the next task to the task 3-2-1, to the user interface device 3 of the user. The task information contains res3 as the resource for the task task3-2-2.

Assume that the degree of proficiency that is estimated from the period of time used for the task task2 is updated to "4". In that case, the schedule mediating unit 12 selects, from the structured task DB 21, the subtask group that corresponds to the granularity of the next task task3 corresponding to the updated degree of proficiency "4". Herein, it is assumed that the subtask groups task3-1 and task3-2 correspond to the granularity corresponding to the degree of proficiency "4" of the task task3. Accordingly, the schedule mediating unit 12 performs scheduling with respect to each task of the selected subtask group. Based on the scheduling, the linking unit 13 presents the task information of the task task3-1, which is the selected next task, to the user interface device 3 of the user. The task information contains res1 as the resource for the task task3-1.

Subsequently, based on the scheduling, the linking unit 13 presents the task information of the task task3-2, which is the next task to the task 3-1, to the user interface device 3 of the user. The task information contains res2 and res 3 as the resources for the task task3-2.

In this way, in the information presentation operation, depending on the degree of proficiency of the user toward the task flow (project) that differs according to the work details, the tasks can be presented to the user at appropriate granularities. As a result, for a user having a high degree of proficiency, since there is less system intervention, it enables creation of an easy-to-work environment. On the other hand, for a user having a low degree of proficiency, since a lot of support can be received from the system, it enables creation of an easy-to-work environment. That is, the information presentation operation enables achieving optimization of task execution. Meanwhile, it is difficult for a person to evaluate his or her own degree of proficiency. Thus, it becomes troublesome for a person to input his or her own degree of proficiency. However, in the information presentation operation, since the degree of proficiency of a user is automatically determined, the evaluation to be performed by the person can be performed automatically. Thus, in the information presentation operation, it becomes possible to spare a person from the difficulty of evaluating his or her own degree of proficiency.

Example of Structured Task Designing Operation

Figure 8:
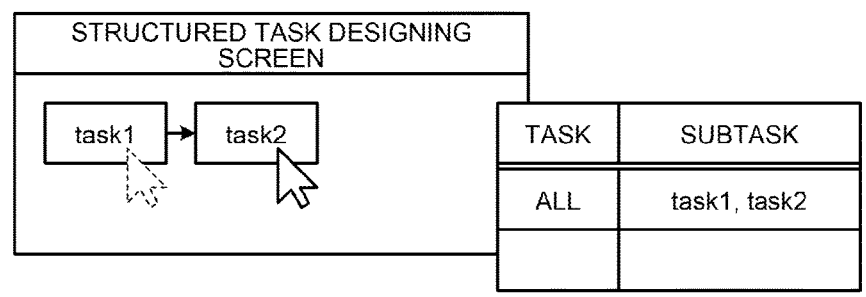
FIG. 8 is a diagram illustrating an example of a structured task designing operation according to the embodiment.
Figure 8:
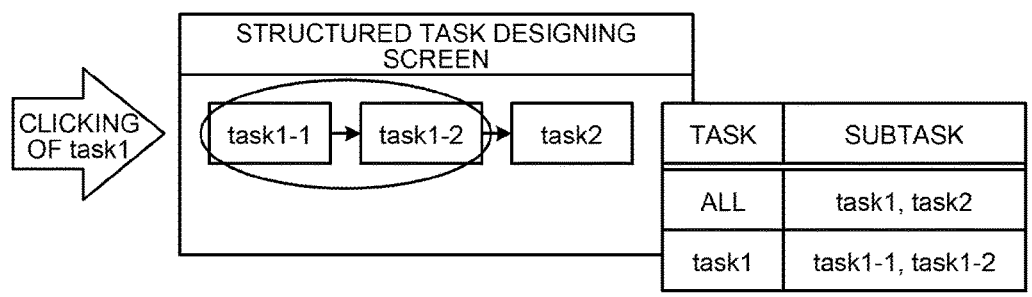

Explained below with reference to FIG. 8 is an example of a structured task designing operation according to the embodiment. FIG. 8 is a diagram illustrating an example of the structured task designing operation according to the embodiment. As illustrated in FIG. 8, it is assumed that the user adds tasks task1 and task2 to the user-specified task flow. The structured task designing unit 11 displays a structured task designing screen, and uses the structured task designing screen to add the task task1 at the user-specified position in the specified task flow. Moreover, using the structured task designing screen, the structured task designing unit 11 adds the task task2 to the right side of the task task1 based on the user specification. Then, the structured task designing unit 11 associates the added tasks task1 and task2 with the specified task flow, and updates the task flow DB 22.

Given below is the explanation of a case in which the task task1 is divided into subtask groups task1-1 and task1-2 by the user. Using the structured task designing screen, the structured task designing unit 11 identifies the task task1, which is clicked by the user, from the task flow DB 22. Then, based on the user specification, the structured task designing unit 11 adds the tasks task1-1 and task1-2 under the identified task task1. Moreover, the structured task designing unit 11 associates the tasks task1-1 and task1-2 with the specified task flow as the subtasks of the task task1, and updates the task flow DB 22. Furthermore, the structured task designing unit 11 updates the structured task DB 21 with the aim of concatenating the resources of the subtasks task1-1 and tasks 1-2 with the resource of the task task1.

Example of Resource Concatenation

Figure 9A:
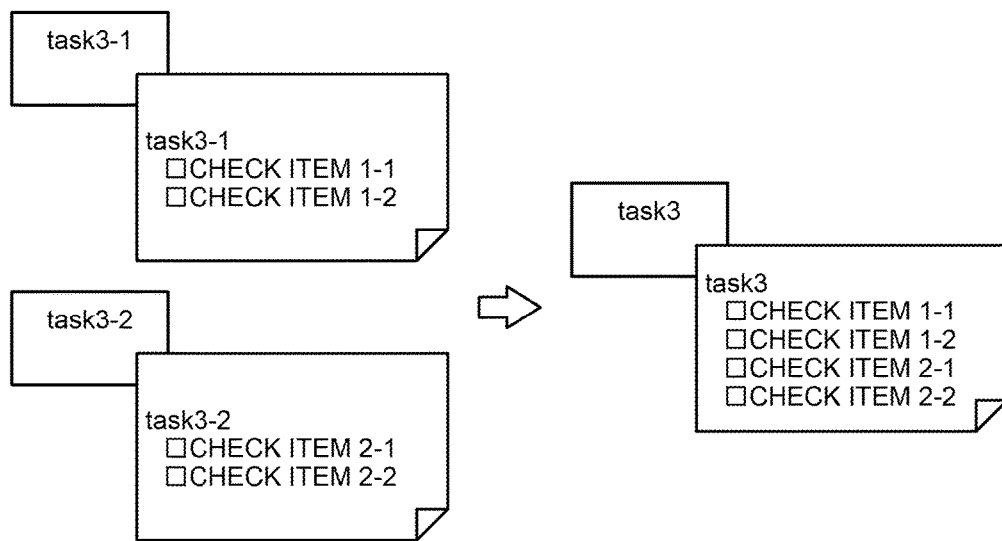
FIG. 9A is a diagram (1) illustrating an example of resource concatenation.
Figure 9B:
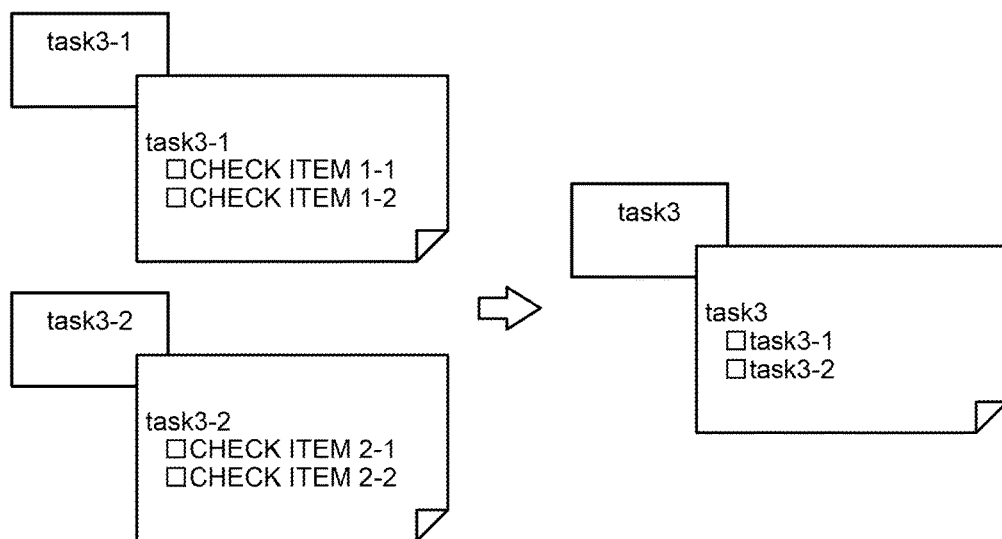
FIG. 9B is a diagram (2) illustrating an example of resource concatenation.
Figure 9C:
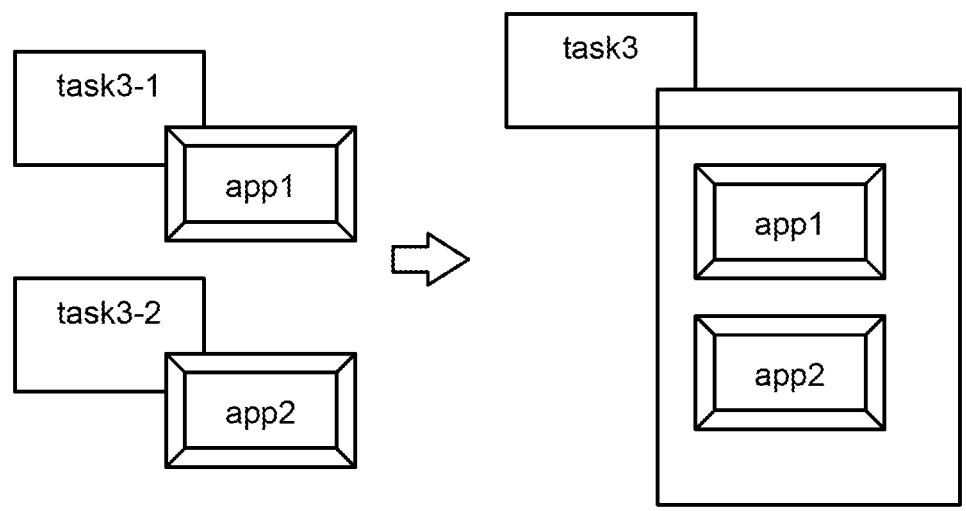
FIG. 9C is a diagram (3) illustrating an example of resource concatenation.

Explained with reference to FIGS. 9A to 9C are examples of resource concatenation. FIGS. 9A to 9C are diagrams illustrating examples of resource concatenation. With reference to FIGS. 9A and 9B, the resource is explained as a checklist. With reference to FIG. 9C, the resource is explained as a list of applications. Herein, it is assumed that task3, task3-1, and task3-2 represent tasks, and task3-1 and task3-2 represent the subtask group of the task task3.

As illustrated in FIG. 9A, the checklist of the task task3-1 includes "check item 1-1" and "check item 1-2". The checklist of the task task3-2 includes "check item 2-1" and "check item 2-2". When the structured task designing unit 11 concatenates the resources of the subtasks task3-1 and task3-2 with the resource of the task task3, the post-concatenation resource of the task task3 becomes as follows. That is, the post-concatenation checklist of the task task3 includes "check item 1-1", "check item 1-2", "check item 2-1", and "check item 2-2".

When the checklists include text either partially or entirely, it is also possible to have a compressed text as the checklist. In FIG. 9B is illustrated an example in which the post-concatenation checklist represents a compressed text obtained by compressing the pre-concatenation checklists. In this case, when the structured task designing unit 11 concatenates the resources of the subtasks task3-1 and task3-2 with the resource of the task task3, the post-concatenation resource of the task task3 becomes as follows. That is, the post-concatenation checklist of the task task3 includes "task3-1" and "task3-2".

As illustrated in FIG. 9C, "app1" represents the list of applications of the task task3-1; and "app2" represents the checklist of the task task3-2. When the structured task designing unit 11 concatenates the resources of the tasks task3-1 and task3-2 with the resource of the task task3, the post-concatenation resource of the task task3 becomes as follows. That is, the post-concatenation list of applications of the task task3 includes "app1" and "app2".

Flowcharts for Structured Task Designing Operation

Figure 10A:
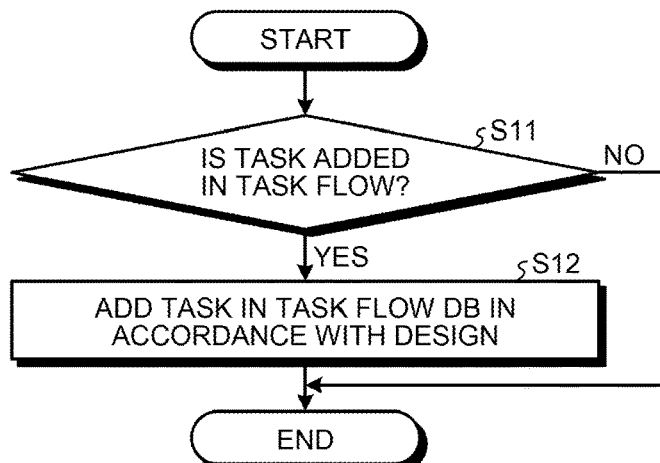
FIG. 10A is a flowchart (1) for explaining a structured task designing operation according to the embodiment.
Figure 10B:
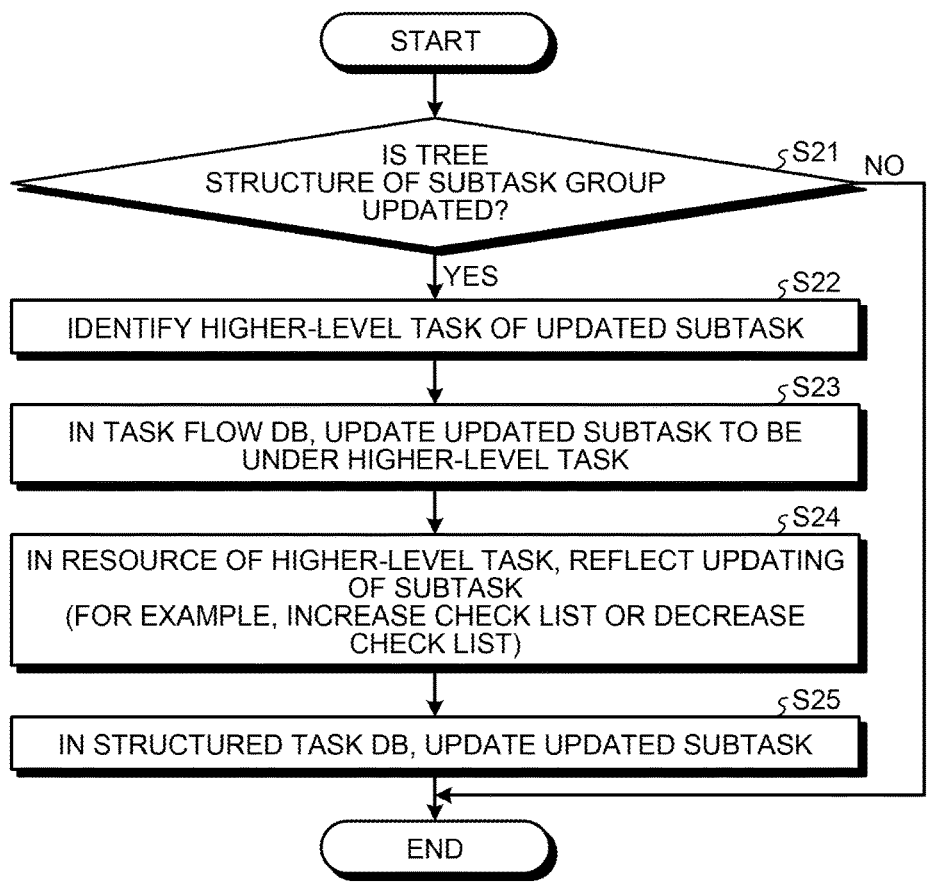
FIG. 10B is a flowchart (2) for explaining the structured task designing operation according to the embodiment.

Explained below with reference to FIGS. 10A and 10B are flowcharts for explaining the structured task designing operation according to the embodiment. FIGS. 10A and 10B are flowcharts for explaining the structured task designing operation according to the embodiment.

As illustrated in FIG. 10A, the structured task designing unit 11 determines whether or not a task is added to a task flow (Step S11). If it is determined that a task is added to a task flow (Yes at Step S11), then the structured task designing unit 11 adds the task to the task flow DB 22 in accordance with the design (Step S12). For example, using the structured task designing screen, the structured task designing unit 11 associates the user-specified additional task to the user-specified task flow, and updates the task flow DB 22. Then, the structured task designing unit 11 ends the structured task designing operation.

Meanwhile, if it is determined that a task is not added to a task flow (No at Step S11), then the structured task designing unit 11 ends the structured task designing operation without performing any operations.

As illustrated in FIG. 10B, the structured task designing unit 11 determines whether or not the tree structure of any subtask group is updated (Step S21). For example, the case in which the tree structure of a particular subtask group is updated implies a case in which a subtask is added to that subtask group, or a case in which a subtask is deleted from or modified in that subtask group.

If it is determined that the tree structure of a subtask group is updated (Yes at Step S21), then the structured task designing unit 11 identifies the higher-level task of the updated subtask (Step S22). Then, in the task flow DB 22, the structured task designing unit 11 updates the updated subtask to be under the identified higher-level task (Step S23).

Subsequently, in the resource 21d of the identified higher-level task, the structured task designing unit 11 reflects the updating of the subtask (Step S24). For example, when a subtask is added, the structured task designing unit 11 increases the checklist of the added subtask. When a subtask is deleted, the structured task designing unit 11 reduces the checklist of the deleted subtask.

Then, in the structured task DB 21, the structured task designing unit 11 adds, deletes, or modifies the updated subtask (Step S25). For example, when a subtask is added, the structured task designing unit 11 adds the information of the added subtask (i.e., the task type, the task name, the subtask, the resource, and the standard period) in the structured task DB 21. When a subtask is deleted, the structured task designing unit 11 deletes the information of the deleted subtask from the structured task DB 21. When a subtask is modified, the structured task designing unit 11 modifies the information of the modified subtask in the structured task DB 21. Then, the structured task designing unit 11 ends the structured task designing operation.

Meanwhile, if it is determined that the tree structure of any subtask group is not updated (Yes at Step S21), the structured task designing unit 11 ends the structured task designing operation without performing any operations.

Flowchart of Proficiency Degree Evaluation Operation

Figure 11:
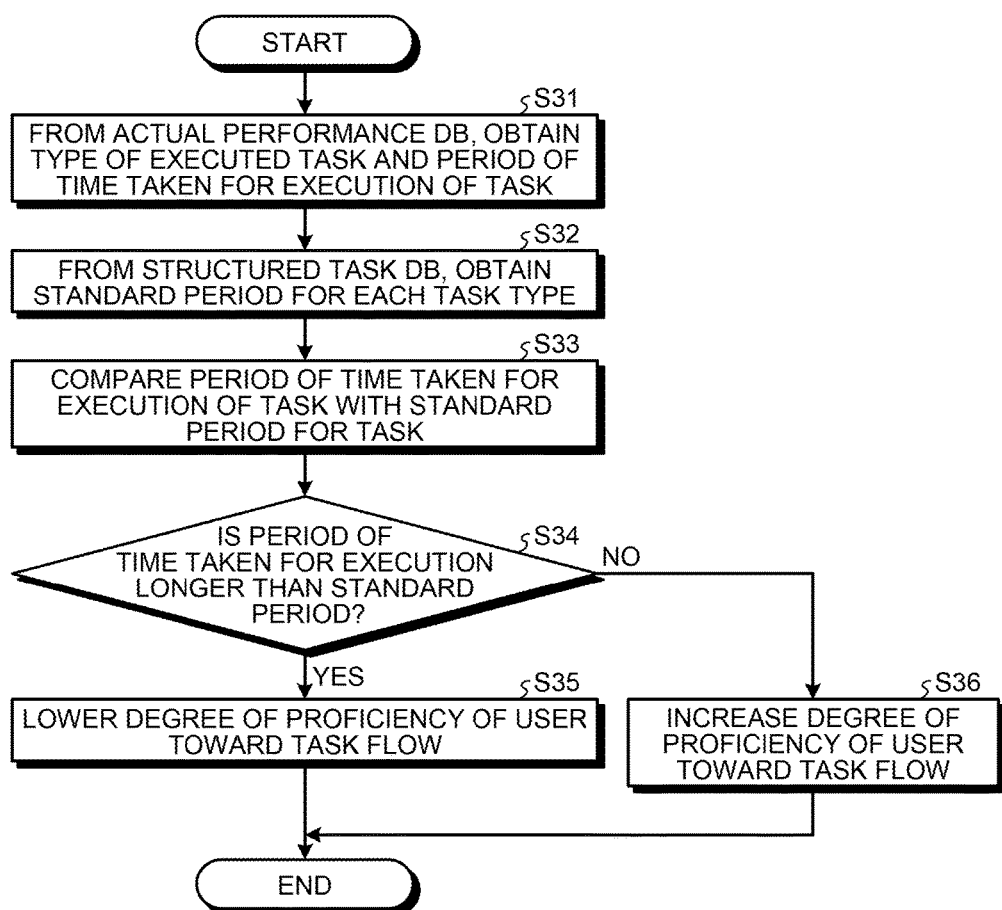
FIG. 11 is a flowchart for explaining a proficiency degree evaluation operation according to the embodiment.

Explained below with reference to FIG. 11 is a flowchart for explaining a proficiency degree evaluation operation according to the embodiment. FIG. 11 is a flowchart for explaining the proficiency degree evaluation operation according to the embodiment. Herein, it is assumed that the user executes a task; and the linking unit 13 stores the actual performance period of the executed task in the actual performance DB 25.

Then, as illustrated in FIG. 11, the proficiency degree evaluating unit 14 obtains, from the actual performance DB 25, the type of the executed task (the task type) and the period of time used for executing the task (the actual performance period) (Step S31). Moreover, the proficiency degree evaluating unit 14 obtains the standard period for each task type from the structured task DB 21 (Step S32).

Then, the proficiency degree evaluating unit 14 compares the period of time used for executing the task (the actual performance period) with the standard period of the task (Step S33). Thus, the proficiency degree evaluating unit 14 determines whether or not the period of time used for execution (the actual performance period) is longer than the standard period (Step S34).

If the period of time used for execution (the actual performance period) is longer than the standard period (Yes at Step S34), then the proficiency degree evaluating unit 14 lowers the degree of proficiency of the user toward the task flow (Step S35). That is, the proficiency degree evaluating unit 14 updates, as the degree of proficiency of the user toward the task flow, the actually-set degree in the proficiency degree DB 23 to a lower degree. Then, the proficiency degree evaluating unit 14 ends the proficiency degree evaluation operation.

On the other hand, if the period of time used for execution (the actual performance period) is shorter than the standard period (Yes at Step S34), then the proficiency degree evaluating unit 14 increases the degree of proficiency of the user toward the task flow (Step S36). That is, the proficiency degree evaluating unit 14 updates, as the degree of proficiency of the user toward the task flow, the actually-set degree in the proficiency degree DB 23 to a higher degree. Then, the proficiency degree evaluating unit 14 ends the proficiency degree evaluation operation.

Flowchart of Schedule Mediation Operation

Figure 12:
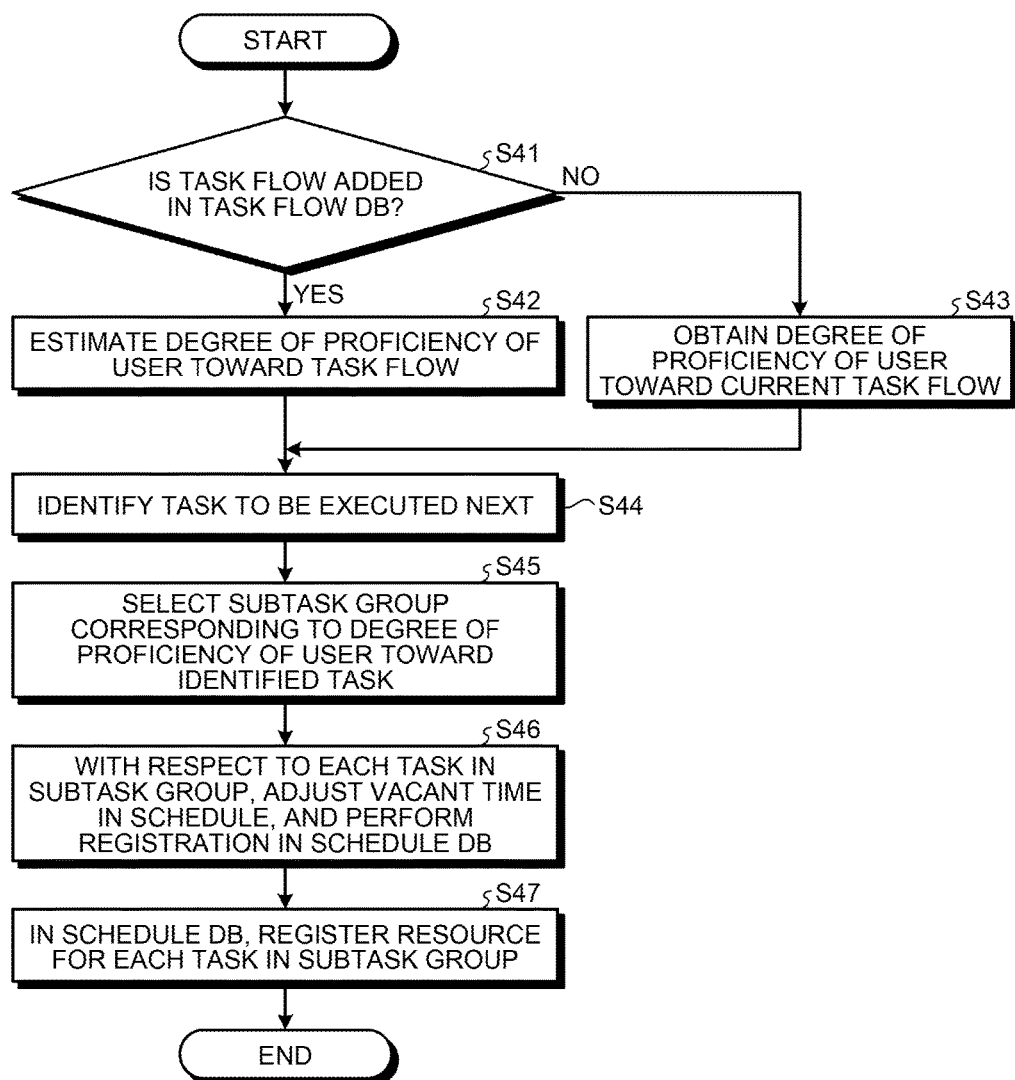
FIG. 12 is a flowchart for explaining a schedule mediation operation according to the embodiment.

Explained below with reference to FIG. 12 is a flowchart for explaining a schedule mediation operation according to the embodiment. FIG. 12 is a flowchart for explaining the schedule mediation operation according to the embodiment. As illustrated in FIG. 12, the schedule mediating unit 12 determines whether or not a task flow is added to the task flow DB 22 (Step S41). If it is determined that a task flow is added to the task flow DB 22 (Yes at Step S41), then the schedule mediating unit 12 estimates the degree of proficiency of the user toward that task flow (Step S42). For example, the schedule mediating unit 12 estimates a predetermined initial value of the degree of proficiency as the degree of proficiency of the current user. As another example, it is assumed that the history of degrees of proficiency toward task flows is recorded. Thus, the schedule mediating unit 12 refers to the history of degrees of proficiency toward task flows, and estimates the degree of proficiency of the current user. Moreover, it is assumed that the history of degrees of proficiency toward task flows is recorded along with the attributes of users (such as the years of experience and the levels of skills). Thus, when a user having the experience of executing the same task flow exhibits similar user attributes; the schedule mediating unit 12 estimates, as the degree of proficiency of the user, the initial value of the degree of proficiency of the user exhibiting similar user attributes. Then, the system control proceeds to Step S44.

Meanwhile, if it is determined that a task flow is added to the task flow DB 22 (Yes at Step S41), then the schedule mediating unit 12 obtains the degree of proficiency of the user toward the current task flow from the proficiency degree DB 23 (Step S43). Then, the system control proceeds to Step S44.

At Step S44, the schedule mediating unit 12 identifies the task to be executed next from the task flow DB 22 (Step S44). Then, the schedule mediating unit 12 selects a subtask group corresponding to the degree of proficiency of the user toward the identified task (Step S45).

Subsequently, the schedule mediating unit 12 adjusts, with respect to each task in the selected subtask group, the vacant time in the schedule and performs registration in the schedule DB 24 (Step S46). Besides, the schedule mediating unit 12 registers, in the schedule DB 24, the resource for each task in the subtask group (Step S47). Then, the schedule mediating unit 12 ends the schedule mediation operation.

Specific Example of Information Presentation Operation for Advanced User

Figure 13:
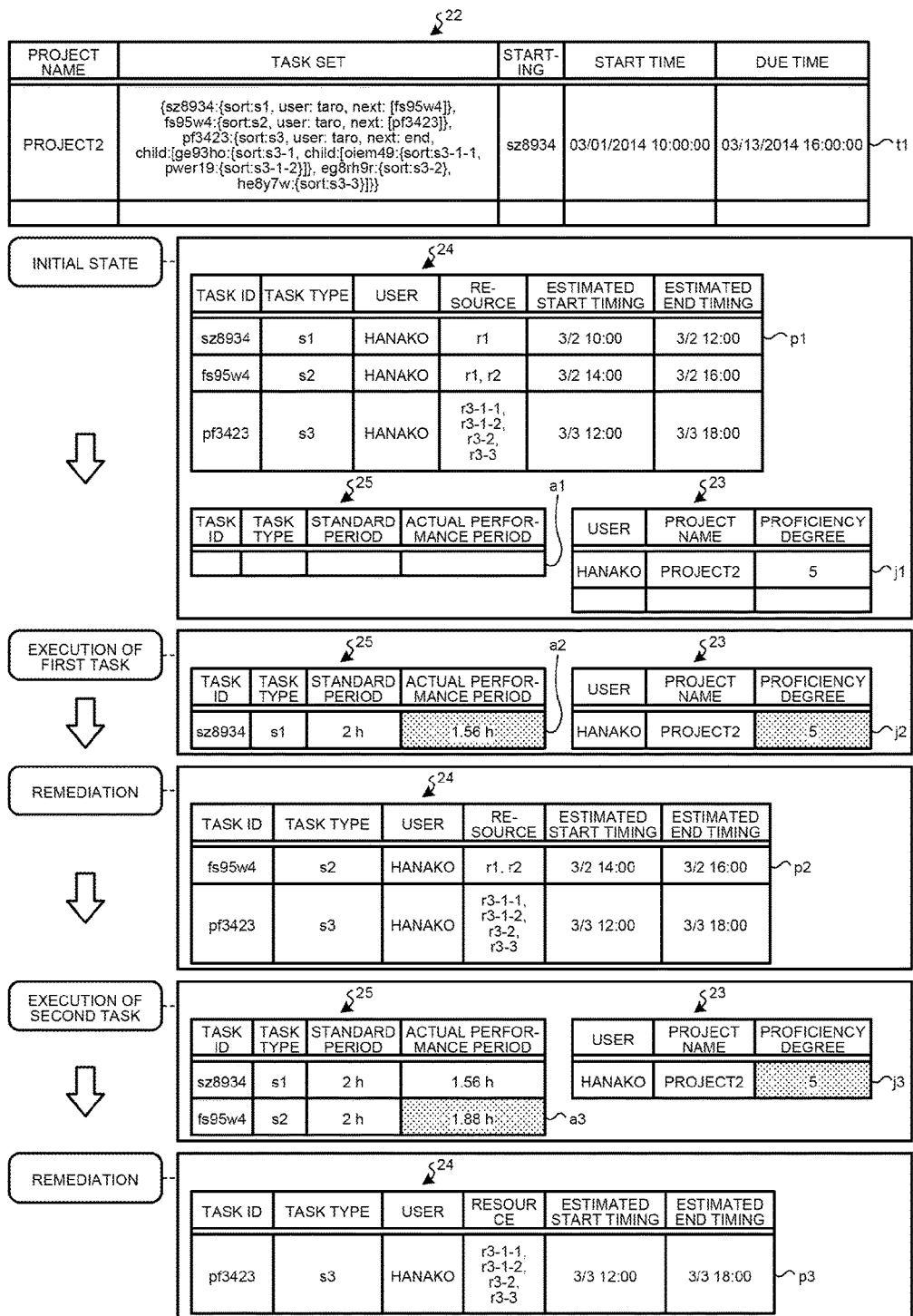
FIG. 13 is a diagram illustrating a specific example of the information presentation operation for an advanced user.

Explained below with reference to FIG. 13 is a specific example of an information presentation operation for an advanced user. FIG. 13 is a diagram illustrating a specific example of the information presentation operation for an advanced user. As illustrated in FIG. 13, in the initial state, the task flow DB 22, the schedule DB 24, the actual performance DB 25, and the proficiency degree DB 23 are illustrated. In the task flow DB 22, information (t1) of the task flow of "project2" as the project name is stored. In the schedule DB 24, when "sz8934" represents the task ID; "Hanako" is stored as the user, "r1" is stored as the resource, "3/2 10:00" is stored as the estimated start timing, and so on (p1). In the actual performance DB 25, no information is stored yet (a1). In the proficiency degree DB 23, when "Hanako" represents the user; "project2" is stored as the project name and "5" is stored as the initial value of the degree of proficiency (j1). Herein, when the degree of proficiency is set to "5", it indicates that the user is an advanced user.

In such a situation, the linking unit 13 presents, to the user (Hanako), the task information corresponding to the task ID "sz8934" of the task to be executed next. The task information contains "r1" as the resource, "3/2 10:00" as the estimated start timing, and "3/2 12:00" as the estimated end timing.

In the user interface device 3 of the user (Hanako), the display unit 31 displays the task information corresponding to the task ID "sz8934". Then, based on the user instruction, the executing unit 32 executes the task having the task ID "sz8934". That is, the executing unit 32 executes the first task. At the start of execution of that task, the executing unit 32 sends an execution start notification about the task to the scheduling supporting device 1. At the completion of execution of that task, the executing unit 32 sends an execution completion notification about the task to the scheduling supporting device 1.

In the scheduling supporting device 1, the linking unit 13 receives the execution start notification and the execution completion notification about the task having the task ID "sz8394". Then, the linking unit 13 stores, in the actual performance DB 25, the actual performance period for the task having the task ID "sz8934". Herein, it is assumed that "1.56 h", which is shorter than the standard period of "2 h", is stored as the actual performance period corresponding to the task ID "sz8934" (a2). Since the actual performance period corresponding to the task ID "sz8934" is shorter than the standard period; the proficiency degree evaluating unit 14 determines that the user is an advanced user and updates, as the degree of proficiency of the user toward the project name "project2", "5" that is actually set in the proficiency degree DB 23 (j2).

Subsequently, the schedule mediating unit 12 identifies, from the task flow DB 22, the task to be executed next to the task having the task ID "sz8934" with respect to the project name "project2". Herein, the task having a task ID "fs95w4" is identified as the task to be executed next. Then, based on the task flow DB 22, the schedule mediating unit 12 selects a subtask group corresponding to the degree of proficiency of the user toward the task to be executed next. Herein, regarding the task having the task ID "fs95w4", since only the task having the task ID "fs95w4" represents the subtask group, the task having the task ID "fs95w4" is selected. Then, with respect to the selected task having the task ID "fs95w4", the schedule mediating unit 12 adjusts the vacant time in the schedule of the user (Hanako) and performs registration in the schedule DB 24 (p2). That is, the schedule mediating unit 12 remediates the schedule of the task having the task ID "fs95w4".

Then, the linking unit 13 presents, to the user (Hanako), the task information corresponding to the task ID "fs95w4" of the task to be executed next. The task information contains "r1, r2" as the resources, "3/2 14:00" as the estimated start timing, and "3/2 16:00" as the estimated end timing.

In the user interface device 3 of the user (Hanako), the display unit 31 displays the task information corresponding to the task ID "fs95w4". Then, based on the user instruction, the executing unit 32 executes the task having the task ID "fs95w4". That is, the executing unit 32 executes the second task. At the start of execution of that task, the executing unit 32 sends an execution start notification about the task to the scheduling supporting device 1. At the completion of execution of that task, the executing unit 32 sends an execution completion notification about the task to the scheduling supporting device 1.

In the scheduling supporting device 1, the linking unit 13 receives the execution start notification and the execution completion notification about the task having the task ID "fs95w4". Then, the linking unit 13 stores, in the actual performance DB 25, the actual performance period for the task having the task ID "fs95w4". Herein, it is assumed that "1.88 h", which is shorter than the standard period of "2 h", is stored as the actual performance period corresponding to the task ID "fs95w4" (a3). Since the actual performance period corresponding to the task ID "fs95w4" is shorter than the standard period; the proficiency degree evaluating unit 14 determines that the user is an advanced user and updates without modification, as the degree of proficiency of the user toward the project name "project2", "5" that is actually set in the proficiency degree DB 23 (j3).

Subsequently, the schedule mediating unit 12 identifies, from the task flow DB 22, the task to be executed next to the task having the task ID "fs95w4" with respect to the project name "project2". Herein, the task having a task ID "pf3423" is identified as the task to be executed next. Then, based on the task flow DB 22, the schedule mediating unit 12 selects a subtask group corresponding to the degree of proficiency "5" of the user toward the task to be executed next. Herein, regarding the task having the task ID "pf3423", the tasks having task IDs "ge93ho", "eg8rh9r", and "he8y7w" represent the subtask group. However, the task having the task ID "pf3423" is selected as the subtask group in accordance with the degree of proficiency "5" of the user. Since the degree of proficiency "5" represents the degree of proficiency of an advanced user, the schedule mediating unit 12 selects the task having the task ID "pf3423" with the aim of organizing, in a compact manner, the task information that would be presented later by the linking unit 13. Then, with respect to the selected task having the task ID "pf3423", the schedule mediating unit 12 adjusts the vacant time in the schedule of the user (Hanako) and performs registration in the schedule DB 24 (p3). That is, the schedule mediating unit 12 remediates the schedule of the task having the task ID "pf3423".

As a result, in the scheduling supporting device 1, depending on the degree of proficiency of the user toward "project2", the tasks can be presented to the user at appropriate granularities. Hence, when the user is an advanced user, there is less system intervention, which enables creation of an easy-to-work environment.

Specific Example of Information Presentation Operation for Elementary User

Figure 14:
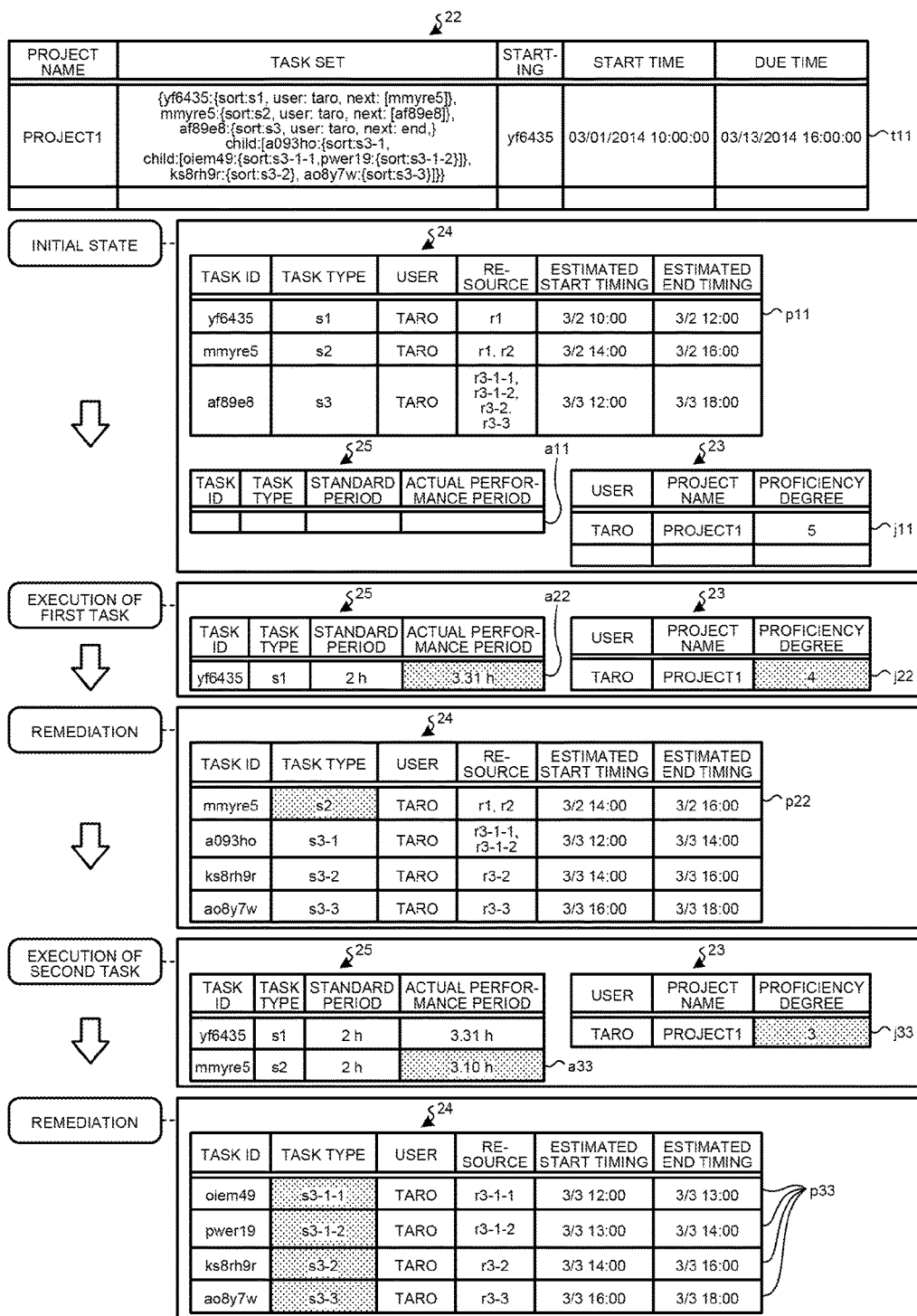
FIG. 14 is a diagram illustrating a specific example of the information presentation operation for an elementary user.

Explained below with reference to FIG. 14 is a specific example of an information presentation operation for an elementary user. FIG. 14 is a diagram illustrating a specific example of the information presentation operation for an elementary user. As illustrated in FIG. 14, in the initial state, the task flow DB 22, the schedule DB 24, the actual performance DB 25, and the proficiency degree DB 23 are illustrated. In the task flow DB 22, information (t11) of the task flow of "project1" as the project name is stored. In the schedule DB 24, when "yf6435" represents the task ID; "Taro" is stored as the user, "r1" is stored as the resource, "3/2 10:00" is stored as the estimated start timing, and so on (p11). In the actual performance DB 25, no information is stored yet (a11). In the proficiency degree DB 23, when "Taro" represents the user; "project1" is stored as the project name and "5" is stored as the initial value of the degree of proficiency (j11). Herein, when the degree of proficiency is set to "5", it indicates that the user is an advanced user.

In such a situation, the linking unit 13 presents, to the user (Taro), the task information corresponding to the task ID "yf6435" of the task to be executed next. The task information contains "r1" as the resource, "3/2 10:00" as the estimated start timing, and "3/2 12:00" as the estimated end timing.

In the user interface device 3 of the user (Taro), the display unit 31 displays the task information corresponding to the task ID "yf6435". Then, based on the user instruction, the executing unit 32 executes the task having the task ID "yf6435". That is, the executing unit 32 executes the first task. At the start of execution of that task, the executing unit 32 sends an execution start notification about the task to the scheduling supporting device 1. At the completion of execution of that task, the executing unit 32 sends an execution completion notification about the task to the scheduling supporting device 1.

In the scheduling supporting device 1, the linking unit 13 receives the execution start notification and the execution completion notification about the task having the task ID "yf6435". Then, the linking unit 13 stores, in the actual performance DB 25, the actual performance period for the task having the task ID "yf6435". Herein, it is assumed that "3.31 h", which is longer than the standard period of "2 h", is stored as the actual performance period corresponding to the task ID "yf6435" (a22). Since the actual performance period corresponding to the task ID "yf6435" is longer than the standard period; the proficiency degree evaluating unit 14 determines that the user is an intermediate user and updates, as the degree of proficiency of the user toward the project name "project1", the degree of proficiency "4" that is lower than the actually-set degree of proficiency in the proficiency degree DB 23 (j22).

Subsequently, the schedule mediating unit 12 identifies, from the task flow DB 22, the task to be executed next to the task having the task ID "yz6435" with respect to the project name "project1". Herein, the task having a task ID "mmyre5" is identified as the task to be executed next. Then, based on the task flow DB 22, the schedule mediating unit 12 selects a subtask group corresponding to the degree of proficiency of the user toward the task to be executed next. Herein, regarding the task having the task ID "mmyre5", since only the task having the task ID "mmyre5" represents the subtask group, the task having the task ID "mmyre5" is selected. Then, with respect to the selected task having the task ID "mmyre5", the schedule mediating unit 12 adjusts the vacant time in the schedule of the user (Taro) and performs registration in the schedule DB 24 (p22). That is, the schedule mediating unit 12 remediates the schedule of the task having the task ID "mmyre5".

Then, the linking unit 13 presents, to the user (Taro), the task information corresponding to the task ID "mmyre5" of the task to be executed next. The task information contains "r1, r2" as the resources, "3/2 14:00" as the estimated start timing, and "3/2 16:00" as the estimated end timing.

In the user interface device 3 of the user (Taro), the display unit 31 displays the task information corresponding to the task ID "mmyre5". Then, based on the user instruction, the executing unit 32 executes the task having the task ID "mmyre5". That is, the executing unit 32 executes the second task. At the start of execution of that task, the executing unit 32 sends an execution start notification about the task to the scheduling supporting device 1. At the completion of execution of that task, the executing unit 32 sends an execution completion notification about the task to the scheduling supporting device 1.

In the scheduling supporting device 1, the linking unit 13 receives the execution start notification and the execution completion notification about the task having the task ID "mmyre5". Then, the linking unit 13 stores, in the actual performance DB 25, the actual performance period for the task having the task ID "mmyre5". Herein, it is assumed that "3.10 h", which is longer than the standard period of "2 h", is stored as the actual performance period corresponding to the task ID "fs95w4" (a33). Since the actual performance period corresponding to the task ID "mmyre5" is longer than the standard period; the proficiency degree evaluating unit 14 determines that the user is an elementary user and updates without modification, as the degree of proficiency of the user toward the project name "project1", the degree of proficiency "3" that is lower than the actually-set degree of proficiency "4" in the proficiency degree DB 23 (j33).

Subsequently, the schedule mediating unit 12 identifies, from the task flow DB 22, the task to be executed next to the task having the task ID "mmyre5" with respect to the project name "project1". Herein, the task having a task ID "af89e8" is identified as the task to be executed next. Then, based on the task flow DB 22, the schedule mediating unit 12 selects a subtask group corresponding to the degree of proficiency "3" of the user toward the task to be executed next. Herein, regarding the task having the task ID "af89e8", the tasks having task IDs "a093ho", "ks8rh9r", and "ao8y7w" represent the subtask group. Moreover, regarding the task having the task ID "a093ho", the tasks having task IDs "oiem49" and "pwer19" represent the subtask group. Then, as the subtask group corresponding to the degree of proficiency "3" of the user, the tasks having the task IDs "oiem49" and "pwer19" are selected that represent the subtask group of the task having the task ID "a093ho". Besides, the task having the task ID "ks8rh9r" and the task having the task ID "ao8y7w" are selected. Since the degree of proficiency "3" represents the degree of proficiency of an elementary user, the schedule mediating unit 12 selects the abovementioned tasks with the aim of presenting, for each task of the subtask group, the task information that would be presented later by the linking unit 13. Then, with respect to each of the selected tasks having the task IDs "oiem49", "pwer19", "ks8rh9r", and "ao8y7w"; the schedule mediating unit 12 adjusts the vacant time in the schedule of the user (Taro) and performs registration in the schedule DB 24 (p33). That is, the schedule mediating unit 12 remediates the schedule of the task having the task ID "af89e8".

As a result, in the scheduling supporting device 1, depending on the degree of proficiency of the user toward "project1", the tasks can be presented to the user at appropriate granularities. Hence, when the user is an elementary user, a lot of support can be received from the system, which enables creation of an easy-to-work environment.

Effect of Embodiment

In the embodiment described above, in the scheduling supporting device 1, one or more sets of task information are stored along with subtask groups each of which corresponds to one set of task information and which is structured to have one or more granularities. Moreover, in the scheduling supporting device 1, at the time of presenting each of a plurality of tasks, from among the subtask group corresponding to the concerned task, the subtasks having the preset granularity are presented in accordance with the structure. With such a configuration, in the scheduling supporting device 1, it becomes possible to optimize the execution of the tasks in each task group forming a task flow.

Moreover, in the embodiment described above, in the scheduling supporting device 1, according to the execution result of the subtask presented by the presented operation, the subtask having the presented granularity is decided from among the subtask group corresponding to the presented next task. In the scheduling supporting device 1, at the time of presenting the next task, the decided subtask is presented in accordance with the structure. With such a configuration, in the scheduling supporting device 1, according to the execution result of a task, the presented granularity of the next task is decided according to the execution result of the previous task. Hence, the next task can be presented at an appropriate granularity. As a result, in the scheduling supporting device 1, it becomes possible to optimize the task execution.

Furthermore, in the embodiment described above, in the scheduling supporting device 1, according to the execution result of the presented subtask, the to-be-presented stage of the presented next task is updated. In the scheduling supporting device 1, from among the subtask group corresponding to the presented next task, the subtask corresponding to the updated stage is decided according to the structure. With such a configuration, in the scheduling supporting device 1, as a result of updating the presented granularity of the next task according to the execution result of the presented subtask, it becomes possible to optimize the presentation granularity of the user with respect to a task flow including a plurality of tasks.

Moreover, in the embodiment described above, in the scheduling supporting device, when the period of time used to execute the presented subtask is longer than the standard period, the preset stage is updated to a lower stage. On the other hand, in the scheduling supporting device, when the period of time used to execute the presented subtask is shorter than the standard period, the preset stage is updated to a higher stage. Then, in the scheduling supporting device 1, from among the subtask group corresponding to the presented next task, the subtask corresponding to the updated stage is decided in accordance with the structure. With such a configuration, in the scheduling supporting device 1, according to the period of time used to execute a task, the presented granularity of the next task is updated. As a result, it becomes possible to optimize the presentation granularity of the user with respect to a task flow including a plurality of tasks.

Furthermore, in the embodiment described above, in the scheduling supporting device 1, during the operations of the scheduling supporting device 1; subtask groups, each of which corresponds to one set of one or more sets of task information and which is structured to have one or more stages, are added, modified, or deleted. With such a configuration, in the scheduling supporting device 1, the structured subtask groups are updated without stopping the system, thereby making it possible to perform a supporting operation having flexibility about scheduling.

Other

Meanwhile, during the execution of a task flow, the structured task designing unit 11 can change the structure of tasks. For example, assume that a task flow includes tasks task2 and task3. During the execution of the task task2 in the task flow, the structured task designing unit 11 can add a task task4 in between the tasks task2 and task3. Alternatively, the structured task designing unit 11 can add a task task3-N to a subtask group under the task task3. Still alternatively, during the execution of the task task2 in the task flow, the structured task designing unit 11 can delete the task task3. Still alternatively, the structured task designing unit 11 can delete any subtask group from among the subtask groups under the task task3. Still alternatively, during the execution of the task task2 in the task flow, the structured task designing unit 11 can modify the task task3. Still alternatively, the structured task designing unit 11 can modify any subtask group from among the subtask groups under the task task3.

Meanwhile, in the embodiment described above, the constituent elements of the device illustrated in the drawings are merely conceptual, and need not be physically configured as illustrated. The constituent elements, as a whole or in part, can be separated or integrated either functionally or physically based on various types of loads or use conditions. For example, the schedule mediating unit 12 and the proficiency degree evaluating unit 14 can be integrated into a single constituent element. Moreover, the linking unit 13 can be separated into a presenting unit that presents the next task to the user and a registering unit that registers the execution result of the presented task. Furthermore, the memory unit including the structured task DB 21, the task flow DB 22, the proficiency degree DB 23, the schedule DB 24, and the actual performance DB 25 can be installed as an external device of the scheduling supporting device 1, and can be connected via a network.

Figure 15:
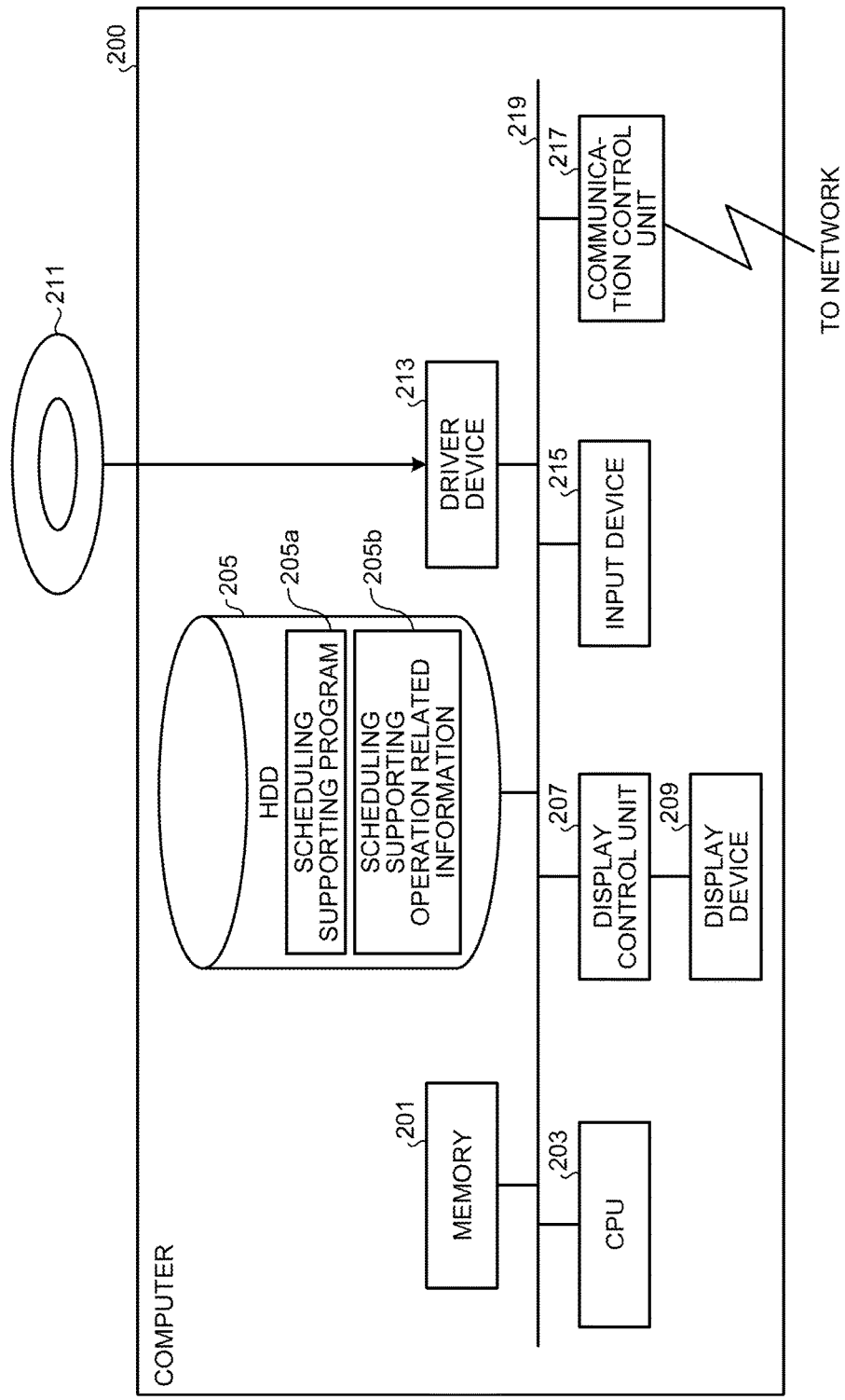
FIG. 15 is a diagram illustrating an exemplary computer that executes a scheduling supporting program.

Meanwhile, various operations explained in the embodiment described above can be implemented when a computer, such as a personal computer or a workstation, executes a computer program provided in advance. Given below is the explanation of an exemplary computer that executes a scheduling supporting program for implementing identical functions to the scheduling supporting device 1 illustrated in FIG. 1. FIG. 15 is a diagram illustrating an exemplary computer that executes the scheduling supporting program.

As illustrated in FIG. 15, a computer 200 includes a central processing unit (CPU) 203 that performs a variety of arithmetic processing; an input device 215 that receives input of data from the user; and a display control unit 207 that controls a display device 209. Moreover, the computer 200 includes a driver device 213 that reads computer programs from a memory medium, and a communication control unit 217 that communicates data with other computers via a network. Furthermore, the computer 200 includes a memory 201 that is used to temporarily store a variety of information, and a hard disk drive (HDD) 205. Herein, the memory 201, the CPU 203, the HDD 205, the display control unit 207, the driver device 213, the input device 215, and the communication control unit 217 are connected to each other by a bus 219.

The driver device 213 is a device meant for using a removable disk 211, for example. The HDD 205 is used to store a scheduling supporting program 205a and scheduling supporting operation related information 205b.

The CPU 203 reads the scheduling supporting program 205a, loads it in the memory 201, and executes it as a process. Herein, the process corresponds to the functional units of the scheduling supporting device 1. The scheduling supporting operation related information 205b corresponds to the structured task DB 21, the task flow DB 22, the proficiency degree DB 23, the schedule DB 24, and the actual performance DB 25. Moreover, for example, the removable disk 211 is used to store a variety of information such as the scheduling supporting program 205a.

Meanwhile, the scheduling supporting program 205a need not always be stored in the HDD 205 from the beginning. Alternatively, for example, the scheduling supporting program 205a can be stored in a portable physical medium such as a flexible disk (FD), a compact disk read only memory (CD-ROM), a digital video disk (DVD), a magneto optical disk, or an IC card that can be inserted in the computer 200. Then, the computer 200 can read the scheduling supporting program 205a from the physical medium and execute it.

According to an aspect of the invention, it becomes possible to optimize the execution of tasks in each task group constituting a task flow.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A scheduling supporting method comprising:
    storing in a storing unit a schedule that includes tasks and has a structure where an execution order of the tasks is specified and subtasks are included in a task, an execution order of the subtasks being specified, wherein a task is completed by a user executing it or subtasks included therein, the storing unit also storing therein a stage corresponding to the user, the stage indicating a value, wherein a task is presented to the user when the stage of the user is a highest value, or a subtask thereof is presented to the user when the task includes subtasks and the stage of the user is lower than the highest value, by a processor;
    presenting to a terminal device of the user a task or a subtask that is included in the schedule and is to be executed by the user, according to the structure and the stage that is predetermined for the user, and receiving a task start notification from the terminal device, by the processor;

updating,
  when receiving a task completion notification from the terminal device,
  when a period of time used by the user to execute the task or subtask presented in the presenting is longer than a standard period that is an average execution period of time, the stage that is predetermined for the user to an updated stage lower than the stage, and
  when the period of time is shorter than the standard period, the stage that is predetermined for the user to an updated stage higher than the stage, by the processor;

deciding, according to the structure and the updated stage, a task or a subtask to be executed next to the presented task or subtask, by the processor; and presenting to the terminal device the decided task or subtask, by the processor.

2. The scheduling supporting method according to claim 1, wherein the storing includes, during operation of providing scheduling support, adding, modifying, or deleting a subtask included in a task, by the processor.

3. An information processing device comprising:
a processor that executes a process including:
storing in a memory a schedule that includes tasks and has a structure where an execution order of the tasks is specified and subtasks are included in a task, an execution order of the subtasks being specified, wherein a task is completed by a user executing it or subtasks included therein, the memory also storing therein a stage corresponding to the user, the stage indicating a value, wherein a task is presented to the user when the stage of the user is a highest value, or a subtask thereof is presented to the user when the task includes subtasks and the stage of the user is lower than the highest value;

presenting to a terminal device of the user a task or a subtask that is included in the schedule and is to be executed by the user, according to the structure and the stage that is predetermined for the user, and receiving a task start notification from the terminal device;

updating,
  when receiving a task completion notification from the terminal device,
  when a period of time used by the user to execute the task or subtask presented in the presenting is longer than a standard period that is an average execution period of time, the stage that is predetermined for the user to an updated stage lower than the stage, and
  when the period of time is shorter than the standard period, the stage that is predetermined for the user to an updated stage higher than the stage;

deciding, according to the structure and the updated stage, a task or a subtask to be executed next to the presented task or subtask; and presenting to the terminal device the decided task or subtask.

4. A non-transitory computer-readable recording medium storing a scheduling supporting program that causes a computer to execute a process comprising:

storing in a storing unit a schedule that includes tasks and has a structure where an execution order of the tasks is specified and subtasks are included in a task, an execution order of the subtasks being specified, wherein a task is completed by a user executing it or subtasks included therein, the storing unit also storing therein a stage corresponding to the user, the stage indicating a value, wherein a task is presented to the user when the stage of the user is a highest value, or a subtask thereof is presented to the user when the task includes subtasks and the stage of the user is lower than the highest value;

presenting, to a terminal device of the user a task or a subtask that is included in the schedule and is to be executed by the user, according to the structure and the stage that is predetermined for the user, and receiving a task start notification from the terminal device;

updating,
  when receiving a task completion notification from the terminal device,
  when a period of time used by the user to execute the task or subtask presented in the presenting is longer than a standard period that is an average execution period of time, the stage that is predetermined for the user to an updated stage lower than the stage, and
  when the period of time is shorter than the standard period, the stage that is predetermined for the user to an updated stage higher than the stage;

deciding, according to the structure and the updated stage, a task or a subtask to be executed next to the presented task or subtask; and presenting to the terminal device the decided task or subtask.

\* \* \* \* \*